United States Patent
Iandolo et al.

(10) Patent No.: US 7,197,737 B1
(45) Date of Patent: Mar. 27, 2007

(54) TECHNIQUES FOR PLACING DUMMY FEATURES IN AN INTEGRATED CIRCUIT BASED ON DIELECTRIC PATTERN DENSITY

(75) Inventors: Walter Iandolo, Santa Clara, CA (US); Yitzhak Gilboa, San Jose, CA (US); Artur Balasinski, Cupertino, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 133 days.

(21) Appl. No.: 11/016,077

(22) Filed: Dec. 17, 2004

Related U.S. Application Data (60) Provisional application No. 60/531,938, filed on Dec. 23, 2003.

(51) Int. Cl.
*G06F 17/50* (2006.01)

(52) U.S. Cl. .......................................... 716/10; 716/8

(58) Field of Classification Search .................. 716/1, 716/8–12
See application file for complete search history.

(56) References Cited

U.S. PATENT DOCUMENTS

| | | | |
|---|---|---|---|
| 6,346,717 B1 * | 2/2002 | Kawata | 257/72 |
| 6,747,321 B2 * | 6/2004 | Kanamori | 257/382 |
| 6,748,579 B2 * | 6/2004 | Dillon et al. | 716/19 |
| 6,782,512 B2 * | 8/2004 | Asakawa | 716/1 |

* cited by examiner

*Primary Examiner*—Jack Chiang
*Assistant Examiner*—Binh Tat
(74) *Attorney, Agent, or Firm*—Okamoto & Benedicto LLP (57) ABSTRACT

In one embodiment, a dummy pattern having a plurality of dummy features (e.g., waffles) are employed to help achieve a relatively planar surface by chemical-mechanical planarization (CMP). The dummy features are placed based on a dielectric pattern density of a region of an integrated circuit. The dummy features may be added to the design of the integrated circuit using a one pass or two pass approach. The dummy features in a second pass may be fragmented using an AndNot algorithm, for example.

17 Claims, 11 Drawing Sheets

TECHNIQUES FOR PLACING DUMMY FEATURES IN AN INTEGRATED CIRCUIT BASED ON DIELECTRIC PATTERN DENSITY

REFERENCE TO RELATED APPLICATION

This application claims the benefit of U.S. Provisional Application No. 60/531,938, filed on Dec. 23, 2003 by Walter Iandolo, Yitzhak Gilboa, and Artur Balanski, which is incorporated herein by reference in its entirety.

BACKGROUND OF THE INVENTION

1. Field of the Invention

The present application relates generally to integrated circuits, and more particularly to integrated circuit design and fabrication.

2. Description of the Background Art

In recent years, integrated circuits (ICs) have been increasing in complexity and in the degree of integration with each generation. Integrated circuits generally include multiple patterned conducting, semiconducting and dielectric layers formed on a substrate, such as a silicon wafer, by a combination of photolithographic, etching and deposition techniques. The increased complexity of latest generation of devices require finer and more accurately formed wiring and interconnects or vias. Thus, before each successive layer is formed, the underlying surface or present layer is planarized by, for example, chemical-mechanical planarization (CMP). CMP, which is also known as "chemical-mechanical polishing," produces a substantially flat surface across the layer provided the layer has a substantially uniform density in a distribution or spacing of elements or features across the surface.

Figure 1:
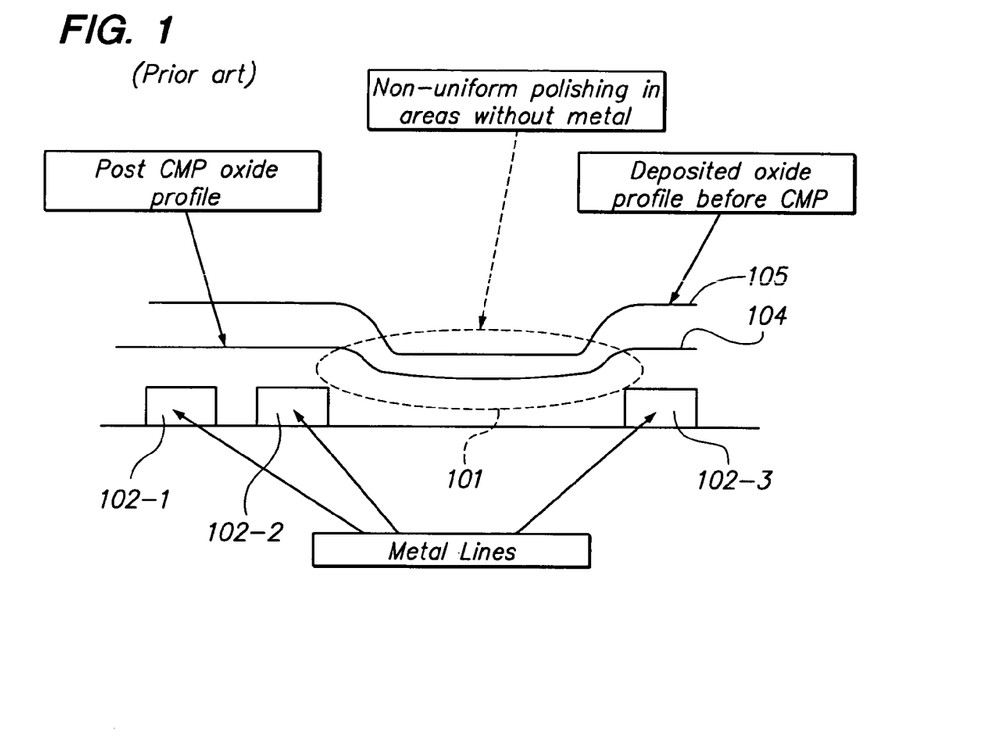
FIG. 1 schematically shows a side sectional view of a portion of an integrated circuit planarized by chemical-mechanical planarization (CMP) without utilizing waffles.

Although planarization can flatten small imperfections relatively well, differences in the size and spacing of various elements in a patterned layer can often yield significant differences in density of the layer, resulting in non-uniform planarization across the surface of the substrate. This is a problem particularly for metal containing wiring and interconnect layers as illustrated in FIG. 1. FIG. 1 schematically shows a side sectional view of a portion of an integrated circuit having metal lines 102 (i.e., 102-1, 102-2, 102-3) and an overlying oxide polished by CMP. In the example of FIG. 1, the non-uniform planarization is in the dashed region 101, in particular between metal lines 102-2 and 102-3. Labels 105 points to the profile of the oxide before the CMP process, while label 104 points to the profile of the oxide after the CMP process.

Figure 2:
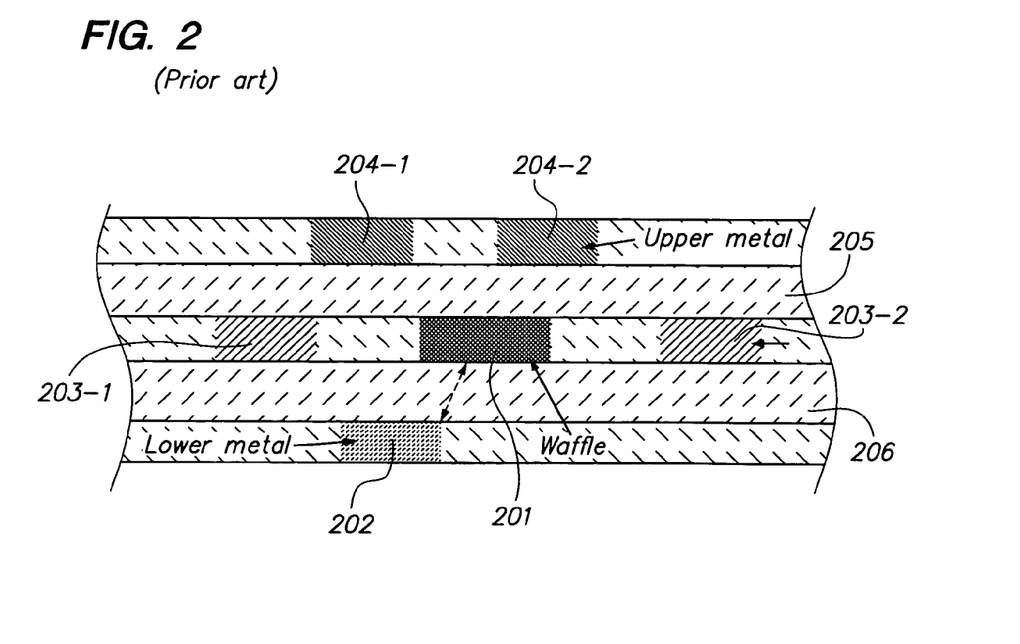
FIG. 2 schematically shows a side sectional view of a portion of an integrated circuit with a waffle.

In the past, the problem of non-uniform planarization has been addressed by adding one or more dummy patterns in regions where a pattern density of the metal lines is below a fixed limit. A dummy pattern includes a plurality of dummy features, such as the so-called "waffles." Waffles are "dummy features" because although they are formed like metal lines, waffles are not designed to have an electrical function in an integrated circuit. That is, although typical waffles comprise metal, they are not designed to carry electrical current. In contrast, a "metal line" or "metal layer" is designed to function as an interconnect. An example of metal lines and a waffle included in a conventional waffling pattern is shown in FIG. 2. In the example of FIG. 2, a waffle 201 is placed between metal lines 203-1 and 203-2 on the same level of the integrated circuit. Metal lines 203-1 and 203-2 are part of a metal pattern that comprises several metal lines. Metal line 202 is on a level of the integrated circuit that is below metal lines 203 (i.e., 203-1, 203-2), while metal lines 204 (i.e., 204-1, 204-2) are on a metal level that is above metal lines 203. Interlayer dielectrics (ILD) 205 and 206 separate the metal levels.

Typically, the inclusion of waffling patterns has been accomplished automatically using computer aided design (CAD) programs and rather simple algorithms that generate waffles of a predetermined size, shape and spacing across the entire surface of the substrate or layer wherever there is no conflict with elements of the metal pattern. Although successful in producing a substantially planar surface, this technique has not been wholly satisfactory for a number of reasons.

Figure 3A:
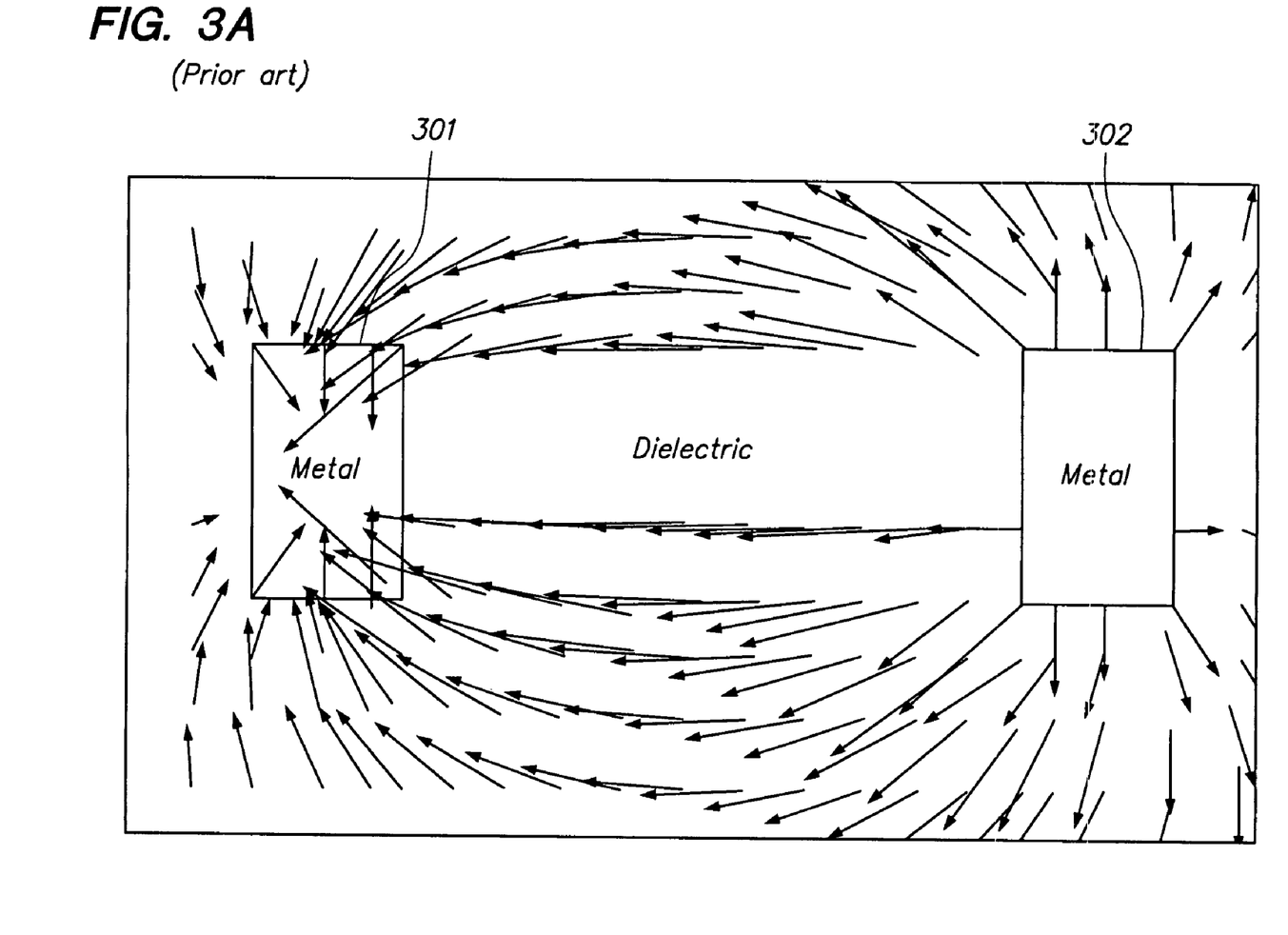
FIGS. 3A and 3B schematically show side views of a portion of an integrated circuit showing electric field coupling between elements of a patterned metal layer without and with an intervening waffle.
Figure 3B:
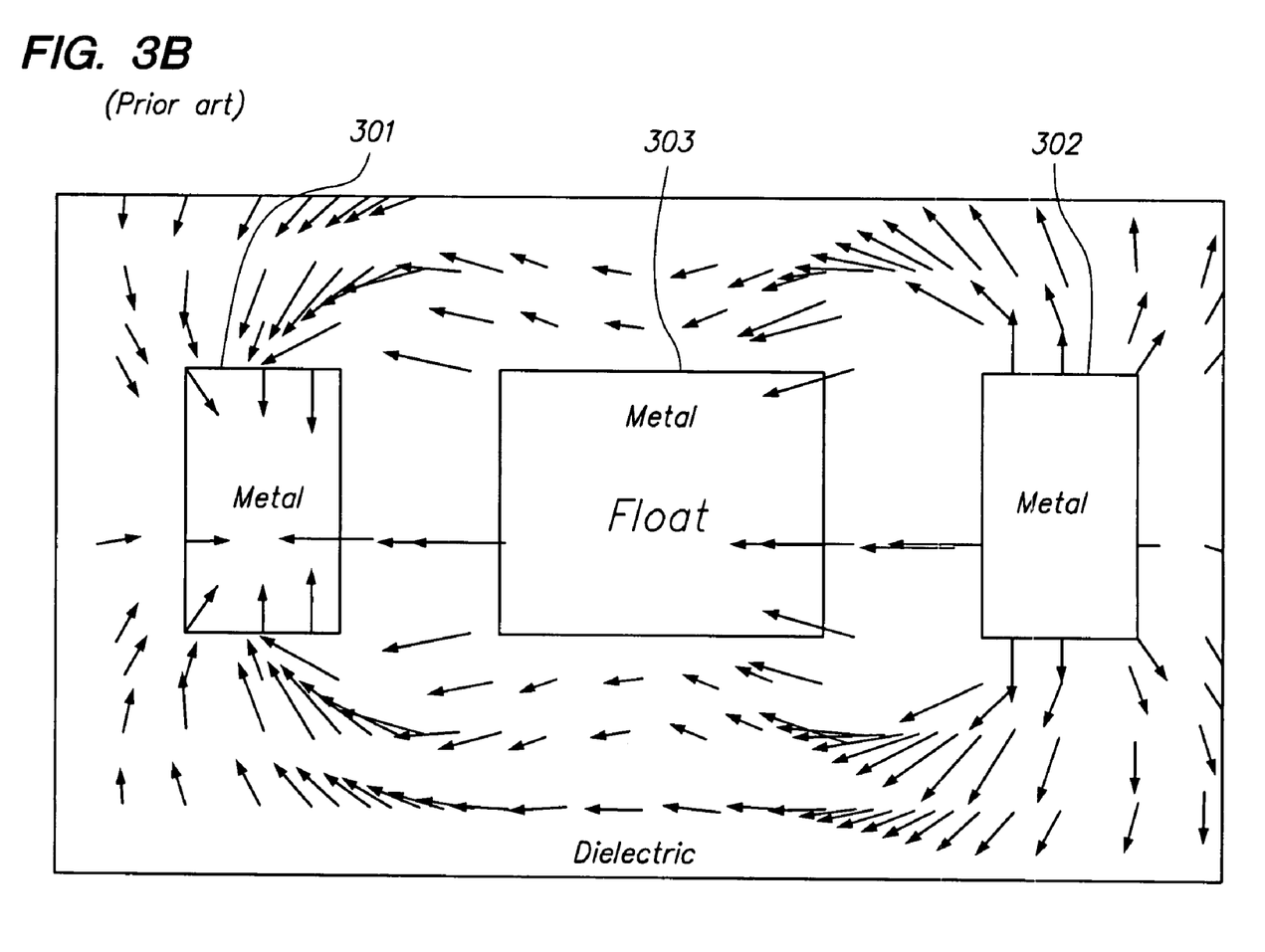

In particular, as circuit geometries decrease and metal thicknesses increase, the waffles have an increasingly large impact on parasitic capacitance and coupling between elements of the metal layer (i.e., between metal lines). Electric fields generated between metal lines 301 and 302 without an intervening waffle are shown in FIG. 3A. FIG. 3B shows coupling between the metal lines 301 and 302 through an intervening, conventionally placed waffle 303. Waffle 303 is electrically floating because it is not designed to carry electrical current. Parasitic capacitance and coupling between metal lines can cause transients that delay signal propagation through them, degrading the performance of the integrated circuit from that for which it was designed. Moreover, as circuit complexity increases, the process of designing and placing the waffles, and of re-checking the design after inclusion of the waffle pattern, consumes increasing amounts of design time and resources.

SUMMARY OF THE INVENTION

In one embodiment, a dummy pattern having a plurality of dummy features (e.g., waffles) are employed to help achieve a relatively planar surface by chemical-mechanical planarization (CMP). The dummy features are placed based on a dielectric pattern density of a region of an integrated circuit. The dummy features may be added to the design of the integrated circuit using a one pass or two pass approach. The dummy features in a second pass may be fragmented using an AndNot algorithm, for example.

These and other features of the present invention will be readily apparent to persons of ordinary skill in the art upon reading the entirety of this disclosure, which includes the accompanying drawings and claims.

The use of the same reference label in different drawings indicates the same or like components. Drawings are not necessarily to scale unless otherwise noted.

DETAILED DESCRIPTION

In the present disclosure, numerous specific details are provided such as examples of parameters, materials, steps, and structures to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Generally, the process steps required to generate a patterned metal layer including metal interconnects, such as horizontal wiring layers and vias, may be described as follows: a) depositing a metal layer; b) forming photoresist on the metal layer, patterning it with metal mask, and developing; c) etching away the exposed portion of the metal layer to form a patterned metal layer; d) depositing an interlayer dielectric (ILD) over the patterned metal; e) planarizing the ILD to a desired thickness (e.g., by CMP); and f) forming photoresist, patterning vias and developing. An important aspect of the just mentioned process is the vertical isolation of metal layers by the ILD of a fixed thickness. Variations in this thickness can translate into variations of via resistance and may even lead to open circuit conditions. The uniformity of ILD depends on a number of factors including: (i) uniformity of the underlying layers on the substrate before metal deposition; (ii) uniformity of the metal deposition process; (iii) uniformity of the metal pattern; and (iv) uniformity of the ILD planarization process.

From a design or layout perspective, only the uniformity of the metal pattern across the wafer surface can be controlled. Historically, metal pattern density (mPD) has been used as the criterion to determine whether a layout is uniform enough to meet manufacturing requirements for ILD thickness variation after planarization. Conventionally, the required metal pattern density was achieved through use of an intrusive waffling algorithm that would create a predetermined, square waffle in any location sufficiently large to accommodate one. At the same time, there was no direct way to verify if the assumed pattern density was actually required from the process standpoint, and what impact inclusion of the waffles would have on the integrated circuit's performance, and in particular the speed of signal propagation through speed critical networks of the integrated circuit.

In contrast, in some embodiments of the present invention, both the physical and electrical effect of waffles on active circuitry may be considered simultaneously in determining both the number of waffles and their placement to minimize their impact on an integrated circuit's performance. To accomplish this, embodiments of the present invention utilize a new parameter, referred to as the "dielectric pattern density" or "oxide pattern density" (oPD). By dielectric pattern density, it is meant the planar density of an oxide pattern derived or calculated from the metal pattern sized by a predetermined thickness of a particular oxide as the deposited ILD (i.e., ILD deposited over the patterned metal before CMP is performed).

Figure 4:
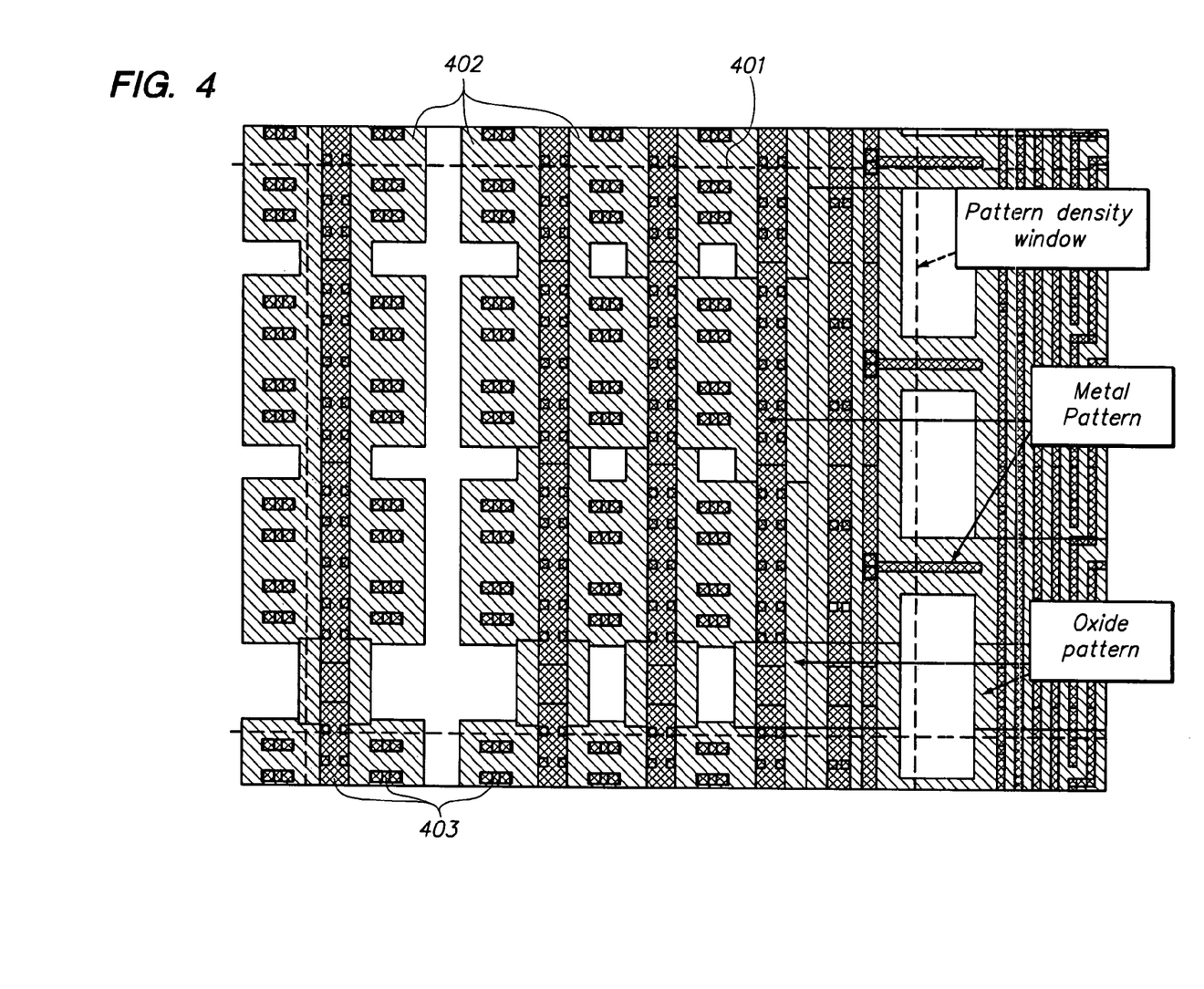
FIG. 4 shows a plan view of an integrated circuit layout having oxide patterns and metal patterns formed thereon in accordance with an embodiment of the present invention.

FIG. 4 shows an integrated circuit layout having an oxide pattern 402 and a metal pattern 403 formed thereon in accordance with an embodiment of the present invention. Only some portions of the oxide pattern 402 and the metal pattern 403 have been labeled in the interest of clarity. The oxide pattern 402 may comprise an ILD formed over the metal pattern 403. Further information about the boundaries of areas occupied by oxide patterns and metal patterns are discussed in connection with FIG. 5.

In the example of FIG. 4, the layout is divided into several regions referred to as "pattern density windows 401". In one embodiment, a pattern density window 401 comprises a 700 μm×700 μm region. A metal pattern density is a measure of the areas occupied by metal patterns in a pattern density window. Using FIG. 4 as an example, a metal pattern density for the pattern density window 401 is equal to the sum of the areas occupied by metal lines of the metal pattern 403 in the pattern density window 401 divided by the total area of the pattern density window 401.

Figure 5:
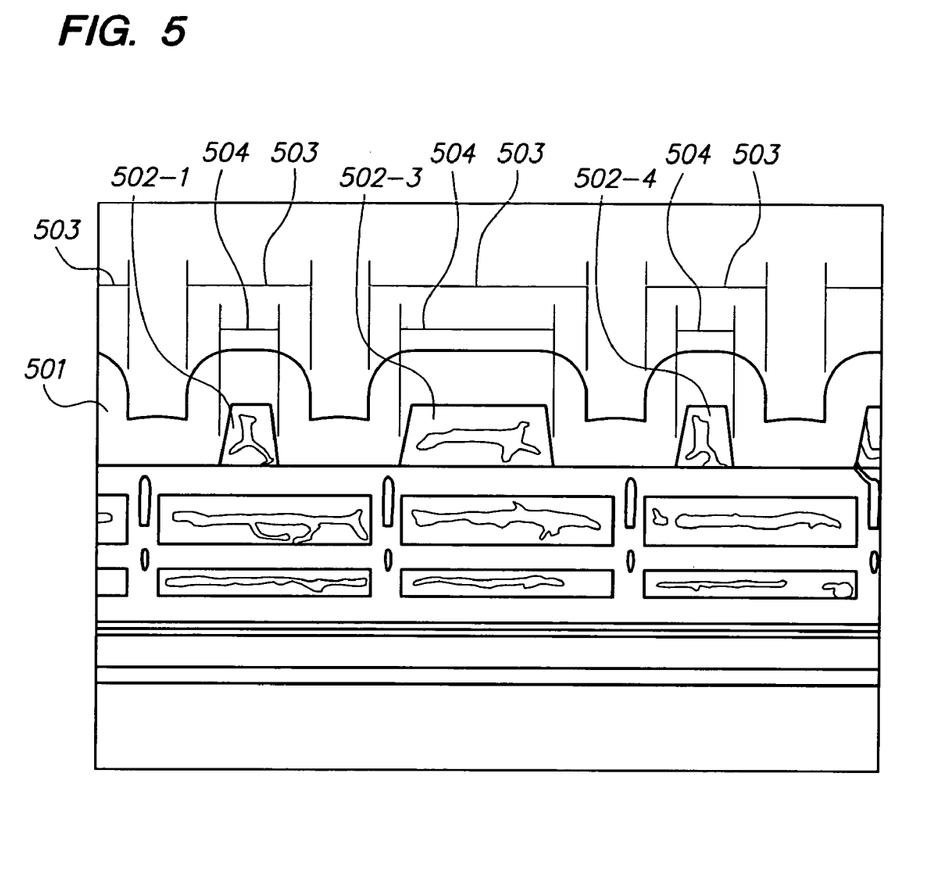
FIG. 5 shows a scanning electron microscope (SEM) image of a sectional side view of a portion of a an integrated circuit having a number of patterned metal layers covered by overlying dielectric, and showing dielectric pattern density as compared to metal pattern density, in accordance with an embodiment of the present invention.

Similarly, a dielectric pattern density is a measure of the areas occupied by dielectric patterns that are conformal to the shape of metal lines in a pattern density window. Using FIG. 4 as an example, a dielectric pattern density for the pattern density window 401 is equal to the sum of the areas occupied by the oxide pattern 402 that are conformal to the shape of metal lines of the metal pattern 403 divided by the total area of the pattern density window 401. For example, as will be further explained in connection with FIG. 5, areas of the ILD that are part of dips (i.e., portions of the dielectric that are non-conformal to metal lines) between metal lines are not taken into account in calculating dielectric pattern density.

For the verification of the waffling process, one may assume different target values for metal pattern density and dielectric pattern density. The correlation between metal pattern density and dielectric pattern density is generally not linear so it is not possible to "translate" one value into the other. The dielectric pattern density distribution, in fact, is related to both width and space distributions of metal lines. For example, it has been found, as noted below, that a dielectric pattern density of at least about 75% is sufficient to provide a uniform planarization of a metal layer covered by an oxide ILD. It should be understood that this an exemplary value only, and that other minimum dielectric pattern densities may be used based on specific product requirements.

Differences between metal pattern density and dielectric pattern density are further illustrated with reference to FIG. 5, which shows a scanning electron microscope (SEM) image of a sectional side view of a portion of an integrated circuit having metal lines 502 (i.e., 502-1, 502-2, . . . )

covered by an overlying dielectric 501. In the example of FIG. 5, black bars labeled as 503 are drawn to define the approximate boundary of the dielectric pattern including dielectric 501, while white bars labeled as 504 define the approximate boundaries of the metal pattern including metal lines 502. Note that the dielectric pattern including dielectric 501 (see bars 503) only includes those portions of dielectric 501 that conform to the metal lines 502. For example, a dielectric pattern does not include the dips between the metal lines 502. In the example of FIG. 5, the ratio between dielectric pattern density and the pattern density window (the whole length of the cross-section in this example) is about 75% while the metal pattern density is about 30%. As can be seen from FIG. 5, the dielectric pattern density is always bigger than the metal pattern density, and the relationship between them is non-linear.

It will be appreciated from the above that during CMP or other polishing process, it is the density of the oxide pattern, i.e., the size of the metal lines when covered with oxide and the spacing between the oxide covered metal lines, that determines the planarity of the resulting polished surface. Put another way, the density of the metal patterns is largely irrelevant to the planarity of the polished surfaced. Furthermore, it is generally not possible to determine a unique, direct correspondence between metal pattern density values and dielectric pattern density values. Therefore, metal pattern density is not appropriate to represent the density distribution of the surface being polished, and the appropriate value for minimum dielectric pattern density may have to be calculated independently from metal pattern density.

In one embodiment, a method determining a minimum dielectric pattern density is as follows: (i) select an aggressive layout (e.g., a device with large logic areas); (ii) simulate residual oxide (Resox; oxide left after polisihing) profile using a calibrated CMP simulator, such as CHAMPS™, commercially available from Ubitech, Inc. of San Jose, Calif.; (iii) identify the locations failing residual oxide thickness requirement; and (iv) determine the value of dielectric pattern density that better corresponds to the failing locations.

Figure 6:
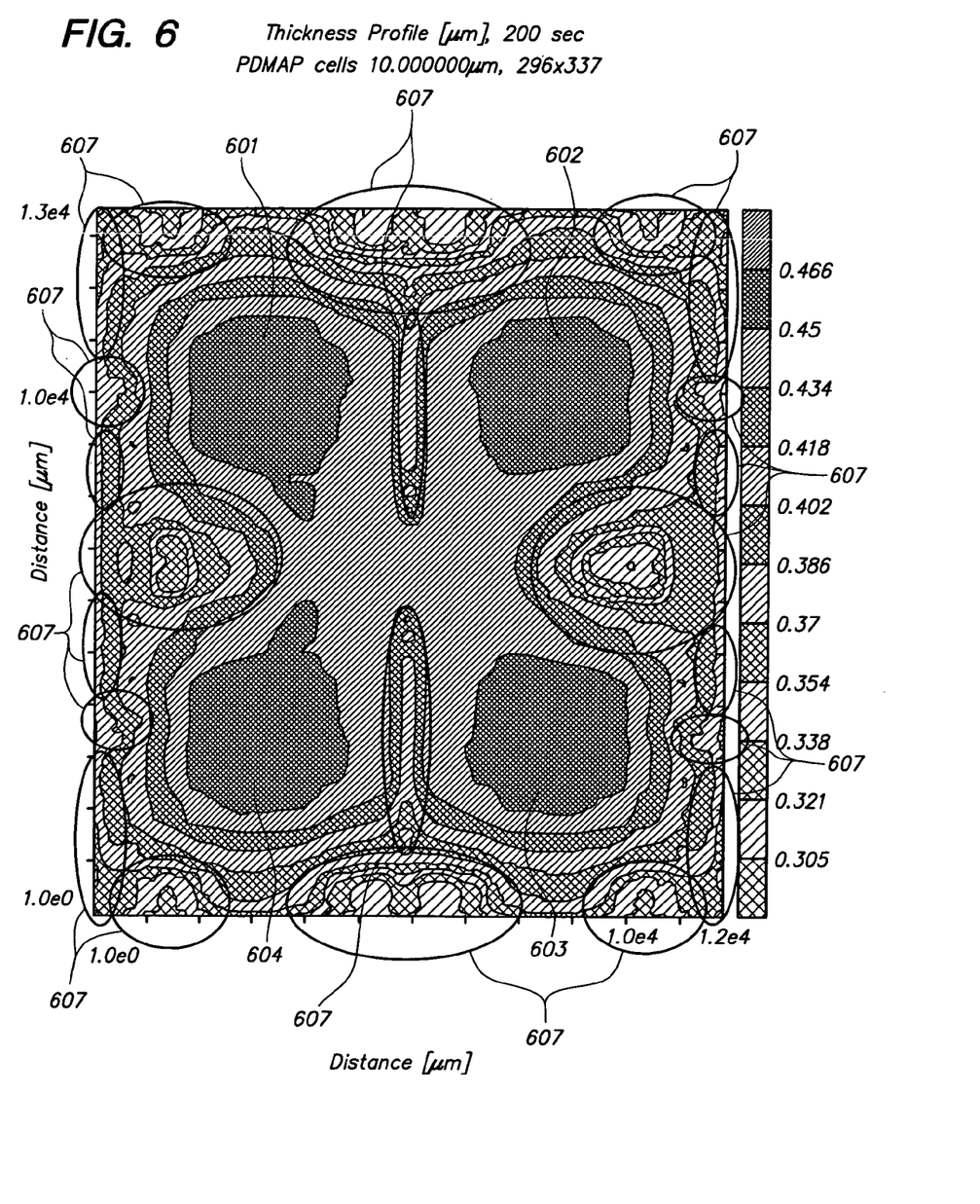
FIG. 6 shows a plan view of a simulation of an interlayer dielectric (ILD) thickness profile of a portion of an integrated circuit layout without waffles.

Data from the just mentioned method may also be used to demonstrate the ineffectiveness of prior waffling methodologies that rely on metal pattern density rather than oxide pattern density. FIG. 6 shows contour lines indicating ILD thickness profile calculated using a CMP simulator program, such as CHAMPS™, on a high speed dual-port memory with array efficiency of about 35% due to large logic areas. Referring to FIG. 6, it is seen that the four regions (labeled 601, 602, 603 and 604) corresponding to the memory arrays are extremely dense and correspond to the locations with thicker ILD. The weakest locations for the CMP process appear to be along the periphery, especially in regions where bonding pads are located. Without waffles, the estimated residual oxide variation is about two times higher than a predetermined maximum allowable. The failing locations (labeled as 607) have been identified by considering the maximum allowable residual oxide variation based on requirements for the depth of focus (DOF), a limiting factor in integrated circuits having circuit geometries that have contacts less than about 200 µm. Generally speaking, the maximum oxide variation can be determined based on the most restrictive step in the manufacturing process that is affected by the post-CMP oxide variation.

Figure 7A:
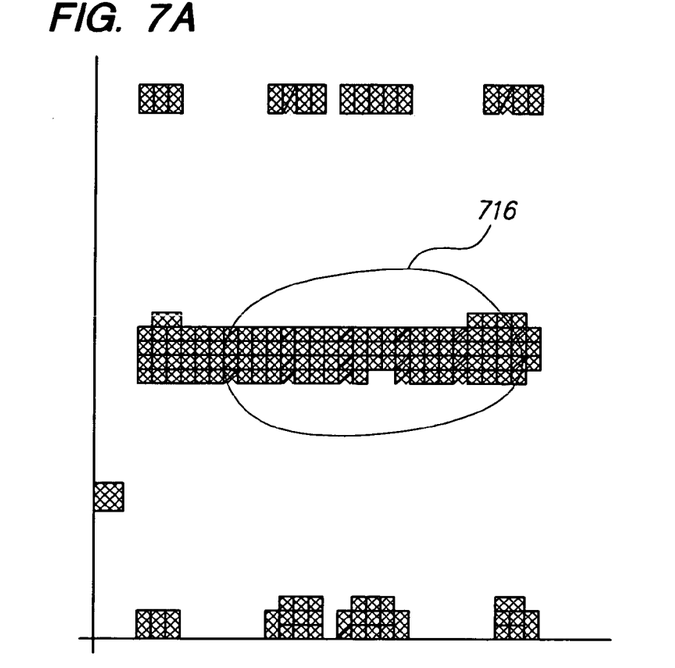
FIGS. 7A and 7B schematically show plan views of a portion of an integrated circuit layout having waffles placed based on metal pattern density and based on dielectric pattern density, respectively.
Figure 7B:
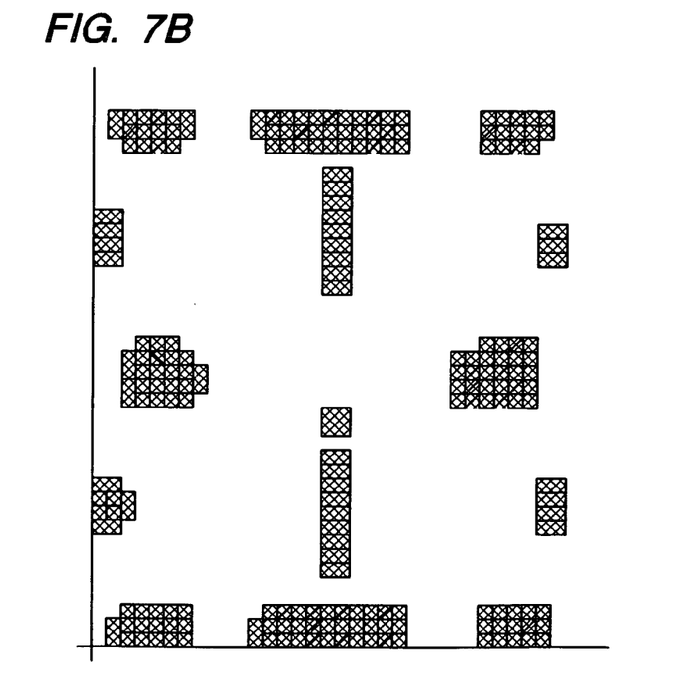

FIGS. 7A and 7B show data extracted for the device of FIG. 6 using pattern density check for a first metal layer (MM1) mask having a metal pattern density of about 36% and a range of dielectric pattern density values from about 70% to about 80% at increments of 5%. In FIGS. 7A and 7B, both of which have been oriented to map over FIG. 6, the shaded/dotted rectangular areas represent waffle locations. FIG. 7A shows how waffles would have been placed in the device of FIG. 6 using conventional waffling process that relies on metal pattern density. FIG. 7B shows how waffles should be placed in the device of FIG. 6. Comparing FIGS. 6 and 7B, note how the waffles of FIG. 7B are correctly placed in areas corresponding to the failing locations 607. In contrast, the waffles of FIG. 7A are not placed in most of the locations that fail to meet the minimum dielectric pattern density.

As can be seen in FIG. 7B, there is a strong correlation between the failing locations and the results of dielectric pattern density check when the dielectric pattern density is about 75%. The matching between the failing locations 607 and the waffles of FIG. 7B confirms that the dielectric pattern density at 75% is a valid parameter (dielectric pattern density minimum) for identifying locations where waffles should be added to achieve the desired residual oxide uniformity.

Using the dielectric pattern density check, it is possible to more accurately determine which regions actually need waffles and restrict the waffled areas accordingly. It is interesting to note that the waffles in the location labeled as 716 in FIG. 7A is flagged as critical with the conventional check using metal pattern density, while simulations of the CMP process and the dielectric pattern density check of the present invention reveal that location 716 mostly meet the CMP requirements.

Electrical Background

As noted above, the presence of dummy metal features, such as waffles, in an integrated circuit increases parasitic capacitance. In particular, as shown in FIGS. 3A and 3B, an element of the metal pattern (i.e., a metal line) and an adjacent dummy feature forms a capacitor in which the two elements act as plates with the ILD as the dielectric.

FIGS. 3A and 3B are schematic cross-sectional views of metal lines of an integrated circuit at different potential, showing electric fields extending between the metal lines without and with an intervening waffle. When the waffle 303 (which is electrically floating) is present, as in FIG. 3B, the electric field increases, as the coupling between the metal lines 301 and 302 through the waffle 303 is stronger. As a first-order approximation, one can assume that the electric field decreases linearly with the space between a waffle and a metal line (as it does for parallel plane capacitors). This means that although any waffle will have "some" electrical impact on signals transmitted in the metal lines, and in particular on a parasitic capacitance with the metal lines, where the space between waffle and lines is large enough, the impact on the capacitance will not be noticeable by the circuit. The simulation of the impact of waffles allows designers to deal with layouts for regions where intrusive waffles cannot be avoided and re-layout is not a viable option. Specifically, by knowing the increase in parasitic capacitance, designers will be able to determine the necessary increase to the drive current to achieve the expected timing even though waffles are present. Thickness of the elements and the dielectric, voltages and dielectric constants may be taken into consideration in determining minimum keep out distance, "K", beyond which the interaction between metal lines and waffles is negligible. By negligible it is meant that the presence of waffles will cause less than 5% delay in propagation of signals or voltages through the adjacent metal lines.

Example Implementation

The next step in the design process is to determine how to implement waffling routines so that they would be the most effective in improving planarization. More preferably, the implementation should be flexible enough not to interfere with the layout of the metal lines. Existing techniques for dummy feature fill or waffling focus only on the pattern density and in particular on the metal pattern density, using algorithms that cannot be implemented in a standard CAD software, such as Assura™ or Calibre™, commercially available from Cadence Design Systems, Inc., Synopsys, Inc., or Mentor Graphics Corp., and must be generated post design or layout of the integrated circuit. Because alteration of layout data without design supervision is not desirable, an embodiment of the present invention takes into account the impact of waffles on metal lines of the same layer as well as on layers above or below during the design or layout process. The objective is to cause a delay in the circuits of the device of less than about 5% on any line in all regions where the other process requirements would not be compromised. These requirements include photolithography process windows, (i.e., waffle printability, impact on other features, macro-loading effects), etch capabilities, software requirements (runtime, memory requirement, complexity) and mask manufacturability (mask writing time, defect inspection). These considerations are often contradictory. That is, a smaller number of waffles will have a smaller impact on capacitance but a larger number may be desired to meet the expected dielectric pattern density. This, in turn, leads to longer runtime, heavier demands on memory and will likely impact mask writing time.

Simulated parasitic extractions of metal lines with and without waffles show that the above objectives can be achieved if: (i) waffles are placed at least 3 um away from metal lines in the same level; and (ii) waffles are not placed either directly above or below a metal line. Simulations have also shown correlation between waffle width/space and the delay of an adjacent or neighboring metal line. It will be appreciated by those skilled in the art that criteria above are specific to the above embodiment only, and in particular the separation between the waffles and metal lines may be different depending on the thickness of the lines and or waffles and an aspect ration of the metal lines. However, the two criteria above have been chosen to meet the above objectives in the waffle layout for most widespread types of integrated circuit architectures or topographies.

Other criteria may also be considered in defining the layout of the waffle pattern including: (i) maximizing waffle efficiency, that is maximizing the increment of dielectric pattern density per waffle or dummy element added; (ii) minimizing waffle count to reduce mask data generation runtime and mask writing time; and (iii) using critical dimension (CD)/Space criteria that are consistent with standard layout practices For example, if a given layer has a given oxide bias, "B", it has been found that maximum effectiveness (i.e., 100% dielectric pattern density) can be achieved by using a spacing of 2×B between waffles, regardless of the waffle size. By oxide bias it is meant the amount of oxide accumulated on the sidewall of a metal line after deposition. It will be appreciated that the oxide bias of a given dielectric can be calculated based on properties of the dielectric or oxide and a known desired thickness to be deposited. Thus, for a given design a 'small' waffle width may be desired to provide a lower metal pattern density, while a large number of the small waffles would be needed to achieve the predetermined minimum dielectric pattern density. On the other hand, a 'large' waffle width may not fit in a normal layout. It has been found through experimentation that one suitable compromise is to use waffles having a width twice as big as the waffle space or 4×B. One reason this is a suitable compromise is that the number of waffles generated is reasonable for mask manufacturing. Waffles that are too small would result in an excessive number of waffles, while waffles that are too large simply would not fit in many locations.

Moreover, with the above parameters, a waffle would fit between two metal lines having a keep out distance of 3 um only if the space between two metal lines is at least: (3 um+4×B+3 um). Thus, one single type or size of waffle may not be able to provide the desired flexibility to adapt to most layout patterns.

One effective solution to the above difficulty is to use two independent passes or waffle patterns to place waffles with different properties. The first pass would be to place relatively large non-intrusive waffles that meet the keep out distance (e.g., 3 um) from any metal line on the same level. With this approach, most of the empty areas on the integrated circuit die will be filled. However, this may not be sufficient to bring the dielectric pattern density up to the minimum dielectric pattern density, e.g., 75%, in every region or area of the layout. In another embodiment, a second pass waffling is used to fill every location large enough where a printable feature, i.e., a smaller waffle, can be placed.

However, using small waffles alone may not provide a satisfactory solution in all instances since the feature count would grow exponentially with the use of smaller waffles, and the placement of the smaller waffles will still be restricted to relatively large regions of the integrated circuit. By large it is meant a region of at least, as much as the waffle critical dimension (CD) plus 2× waffle to metal line keep out distance. A more effective solution for the second pass is to use a so called "AndNot" algorithm or approach, in which the second waffle pattern is generated and then portions of the waffles that are close enough to the metal lines to affect their printability are removed. Commercially available CAD programs are capable of performing AndNot algorithms. The result is a number of conformal waffles having non-predetermined shape and size, and having at least one edge parallel to an edge of an adjacent metal element. Thus, the limit to the waffle size is limited only by the capability of the photo process to resolve small spaces between 'large' lines. Table 1 summarizes the parameters for both procedures.

TABLE I

Parameters For Two-Pass Waffling

| Property | Value 1st pass | Value 2nd pass |
| --- | --- | --- |
| Oxide bias | B | B |
| Waffle width | 4×B | L |
| Space W-W | 2×B | max(2× MinSP, optical radius) |
| Space to metal | K | max(2× MinSP, optical radius) |
| Space to 1st pass | n/a | 6×B + K |
| AndNot - algo.? | NO | YES |
| Min fragment size | n/a | max(2× MinW, min landing pad) |
| Min fragment space | n/a | max(2× MinSP, optical radius) |

In Table I, "oxide bias" is the amount of oxide accumulated on the sidewall of a metal line after deposition, "waffle width" is the with of each waffle, "space W—W" is the spacing between waffles, "space to metal" is the spacing between a metal and a waffle, "Space to $1^{st}$ pass" is the spacing between waffles placed during the first pass and waffles placed during the second pass, "min fragment size" is the minimum size of a fragmented waffle (using the AndNot algorithm) in the second pass, "min fragment space" is the spacing between fragmented waffles in the second pass. Although not shown, it will be appreciated that the "AndNot" approach and the conformal waffles can also be applied to the first pass waffles.

Figure 8:
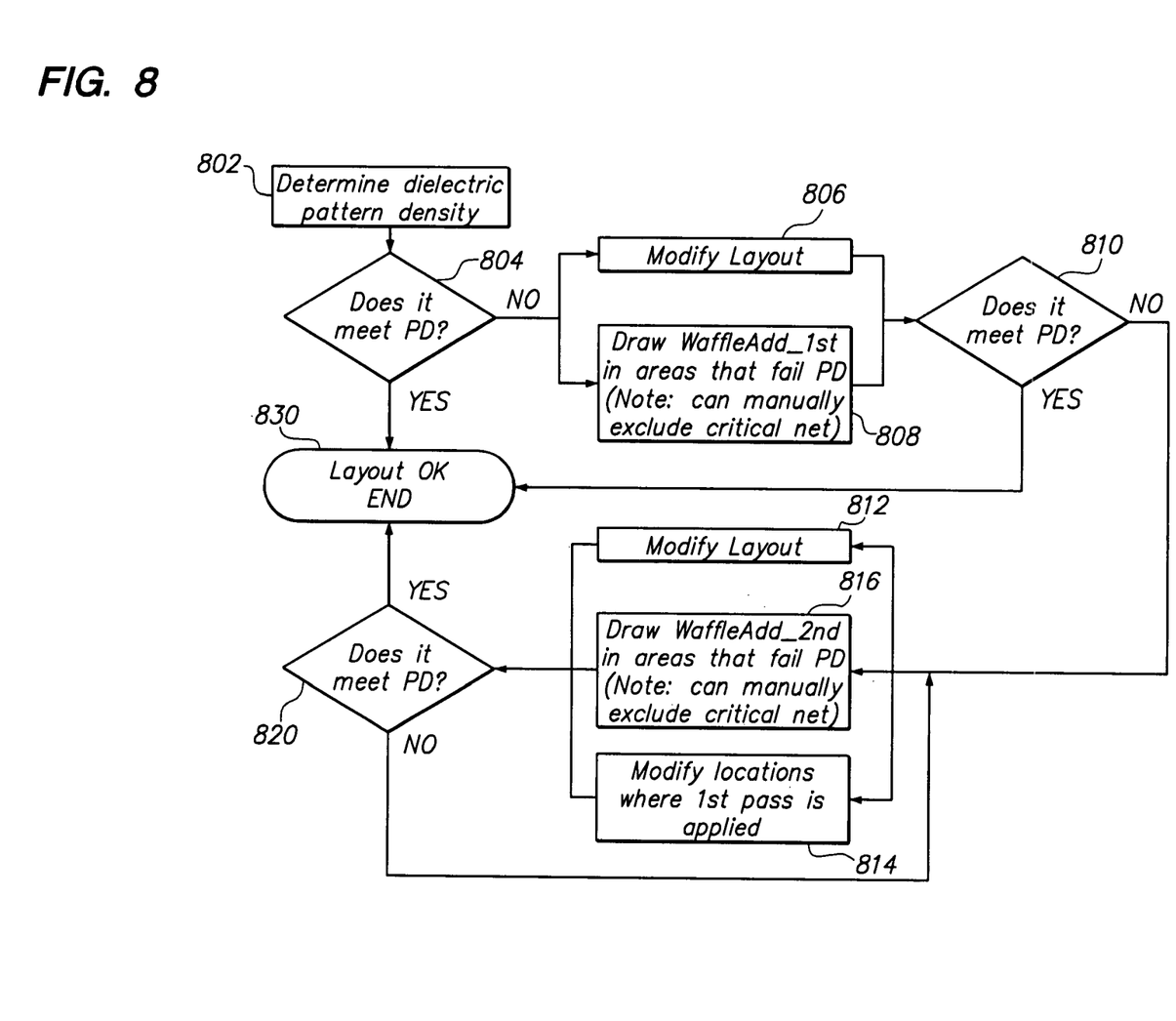
FIG. 8 shows a flow diagram of a method of designing an integrated circuit in accordance with an embodiment of the present invention.

Referring now to FIG. 8, there is shown a flow diagram of a method of designing an integrated circuit in accordance with an embodiment of the present invention. In step 802, the dielectric pattern density of the integrated circuit design is determined. Step 802 may be performed by running CAD flow routines on drawn data for mask data preparation. Next, the integrated circuit layout (e.g., metal pattern or drawn data) is logically divided or portioned into a number of regions (e.g., pattern density windows), and the dielectric pattern density determined or calculated for each region and checked against a predetermined minimum dielectric pattern density.

If all the regions meet the minimum dielectric pattern density requirement, the layout of the device is okay and the process ends in step 830 (step 804 to step 830). If not, a designer may choose to modify the layout, drawn data as indicated in step 806, or add first pass waffles in areas or regions that fail to meet the minimum dielectric pattern density requirement (e.g., 75%) as indicated in step 808. Generally, the first pass waffling pattern is generated automatically using a computer program of the present invention, which is further described below. In a preferred embodiment, the computer program enables the designer to specify within the regions that don't meet the minimum dielectric pattern density, which regions that may be waffled, and/or regions or critical networks in which waffling is prohibited. The dielectric pattern density for the waffled regions is then re-calculated taking into account the waffles added, and checked against the predetermined minimum dielectric pattern density. If all regions meet minimum dielectric pattern density the waffling process ends (step 810 to step 830) and the layout is released for mask creation.

If all regions still fail to meet minimum dielectric pattern density requirements in step 810, the designer may choose to modify the layout as indicated in step 812, modify locations where first pass waffles are applied (e.g., change regions that may be waffled, regions in which waffling is prohibited, or both) as indicated in step 814, or add second pass waffles in regions that fail to meet the minimum dielectric pattern density requirement as indicated in step 816. Preferably, the computer program enables the designer to specify within the regions that don't meet the minimum dielectric pattern density, which regions may be waffled, regions or critical networks in which waffling is prohibited, or both. Finally, in step 820, the dielectric pattern density for the waffled regions is re-calculated taking into account the first and second waffles added, and checked against the predetermined minimum dielectric pattern density. If all regions meet MIN dielectric pattern density the layout is okay and the design is ready for tape-out. If not the process is repeated, and the designer may choose to modify the layout, or modify locations where first and/or second pass waffles are applied. It will be appreciated that the process of the present invention can be extended to any number of waffling patterns having any number waffles of different predetermined shape and size or conformal waffles, without departing from the scope of the invention.

It will also be appreciated that the second waffling pattern or the second pass can be controlled independently from the first waffling pattern, and therefore two "waffle-add" layers can be defined that will identify the regions and sub-regions where each pass will be applied. In this way the areas where "intrusive" waffling is used can be minimized.

In another aspect, the invention is directed to a computer program product for generating a dummy pattern for an integrated circuit. Generally, the computer program product includes a computer readable storage medium and a computer-readable program code embedded therein. In one embodiment, the computer-readable program code includes instructions for: (i) partitioning a substrate into a number of regions; calculating dielectric pattern density for each of the regions; (ii) comparing the calculated dielectric pattern density with a predetermined minimum pattern density to identify from among the regions a number of first regions having calculated dielectric pattern density less than the minimum pattern density; and (iii) adding a first dummy pattern including a number of first dummy features to the first regions.

Figure 9:
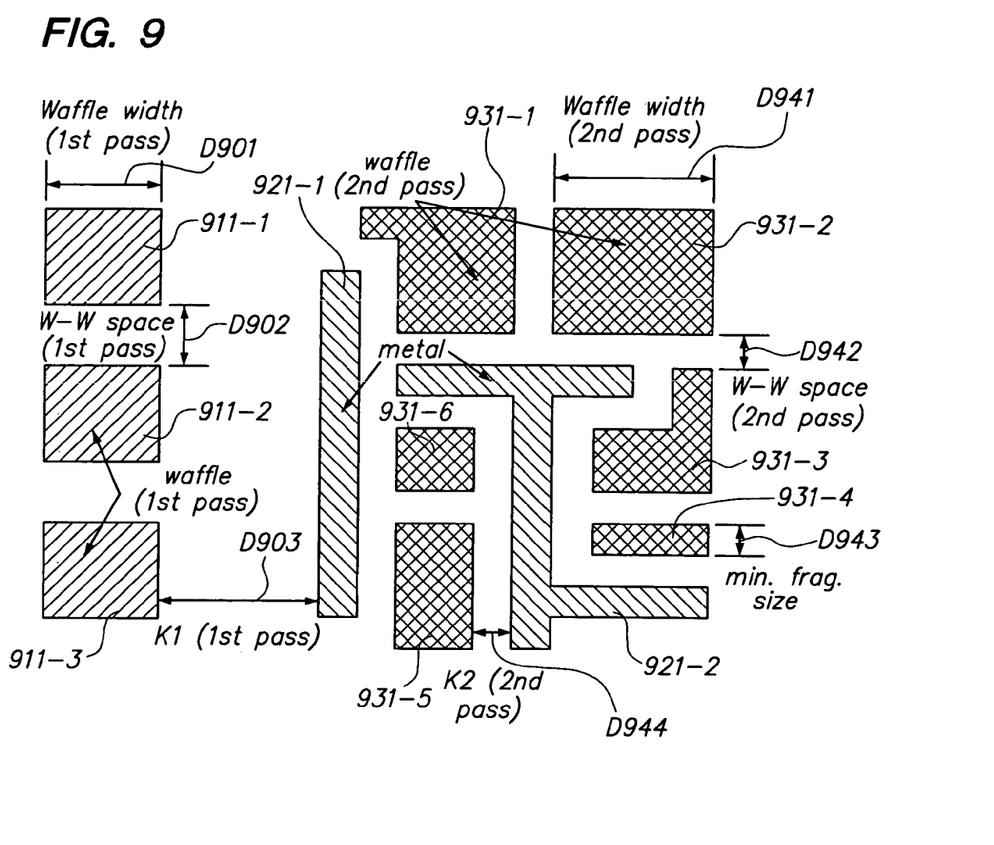
FIG. 9 schematically shows a plan view of a portion of an integrated circuit layout having multiple successively placed waffles in accordance with an embodiment of the present invention.

A conceptual example of an integrated circuit layout with two-pass waffles in accordance with an embodiment of the present invention is shown in FIG. 9. In the example of FIG. 9, metal lines 921 (i.e., 921-1, 921-2) are on the same metal level of the integrated circuit as first pass waffles 911 (i.e., 911-1, 911-2, 911-3) and second pass waffles 931 (i.e., 931-1, 931-2, 931-3, 931-4, 931-5, 931-6). As their name implies, first pass waffles are those placed during the first pass of a two-pass waffling process described above. In the example of FIG. 9, dimension D901 illustrates a waffle width of a first pass waffle, dimension D902 illustrates a waffle to waffle spacing (W—W space) between first pass waffles, and dimension D903 illustrates a keep out distance between a first pass waffle and a metal line 921 (921-1 in this example). Second pass waffles 931 are those placed during the second pass of the two-pass waffling process. Second pass waffles 931 may be placed and appropriately fragmented by a designer or CAD software (e.g., using AndNot algorithm) in accordance with various dimensions supplied by the designer. In the example of FIG. 9, dimension D941 illustrates a width of a second pass waffle, dimension D942 illustrates a waffle to waffle spacing in the second pass, dimension D943 illustrates a minimum size of a fragmented waffle, and dimension D944 illustrates a keep out distance between a second pass waffle and a metal line.

Figure 10:
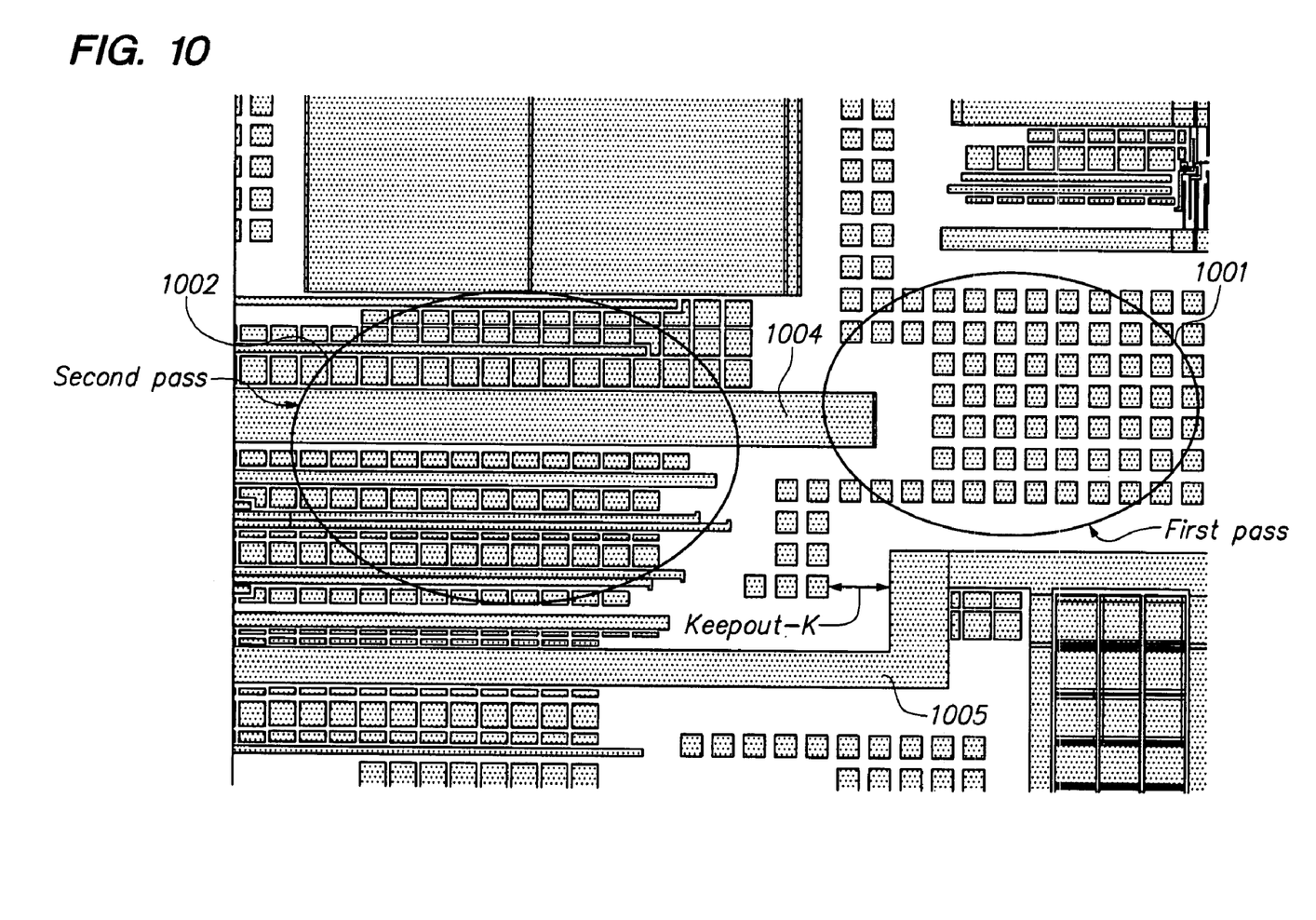
FIG. 10 shows a graphical representation of a portion of an integrated circuit layout with two-pass waffles in accordance with an embodiment of the present invention.

FIG. 10 shows a graphical representation of a portion of an integrated circuit layout with two-pass waffles according to an embodiment of the present invention. The dashed circle 1001 generally shows an area where first pass waffles were placed, while the dashed circle 1002 generally shows an area where second pass waffles were placed. Metal lines 1004 and 1005 were labeled in FIG. 10 for reference purposes.

The criteria used to determine the parameters in each waffling pass of the examples shown in FIGS. 9 and 10 will now be described.

1st Pass Waffles

For the first pass waffles, the bias depends on the thickness of the deposited dielectric or oxide. The thicker the oxide, the larger the bias. This value is not constant across the die due to the wavy factor (oxide thickness is related to the average local metal pattern density) but can be approximated without significant loss of accuracy.

With respect to waffle to waffle spacing (e.g., dimension D902 on FIG. 9), the maximum effectiveness of waffles may be obtained when the two waffles are spaced by no more than 2×B (in that case, the corresponding dielectric pattern density will be 100%). With waffling creating dielectric pattern density of 100%, the waffled areas will over-compensate, i.e., dielectric pattern density minimum is >75%, for less dense areas. This gives designers the opportunity to select the waffled areas as opposed to requiring them to waffle the entire surface of the chip or substrate.

With regard to waffle width and length, it has been found that one suitable embodiment is substantially square first waffles having a width of twice the waffle spacing or 4×B which corresponds to a waffle metal density of about 44.4%.

Keep out space (e.g., dimension D903) can be calculated or defined as the space above which the delay caused by waffles on the same plane as the metal line is below 5%. It will be appreciated that the requirement and the method for calculating keep out space can change for specific application or integrated circuit.

From an electrical standpoint, for metal lines on the same plane (i.e., level) as the waffles, an important parameter is the keep out space. Moreover, the inventors believe that the interactions between waffles and metal lines in different planes is nearly independent of the waffle size. Thus, since a smaller waffle size (and therefore pitch) would require a higher number of waffles to fill empty areas, and increasing amounts of runtime, memory and mask writing time, a larger waffle size is generally preferred.

2nd Pass Waffles

In a preferred embodiment, second pass waffles are used only in locations where the first pass waffles are not sufficient to meet the required dielectric pattern density. The second pass (using the "AndNot" algorithm or approach) is more intrusive, and generally will impact the signal lines potentially causing delays higher than 5%. There are two situations when the use of second pass waffles may be desired. The first is when the layout of metal lines is such that the first pass waffles cannot be created (e.g., sparse metal lines spaced at 4–6×B). The second is to create a region with very high density which can compensate for another, generally adjacent, region where waffles cannot be placed.

The parameters for second pass waffles may be chosen as follows.

First, the waffle to waffle spacing (e.g., dimension D942) is preferably the smallest that can be obtained without introducing any feature that could potentially reduce the process window. An exemplary 'safe' value is twice the minimum spacing (Min space) specified for a given metal layer. However, ultimately, the waffle spacing for second pass waffles is selected to be large enough to guarantee absence of optical proximity effects.

With respect to the waffle width/length, the purpose of the second pass is to substantially fill every area between metal lines spaced large enough to fit a printable feature. Thus, optical proximity is, again, the major limitation.

With regard to keep out space (e.g., dimension D944), the same criteria as the one used for waffle to waffle spacing is followed. The major concern is that the waffles do not reduce the process window.

Finally, the space between second pass and first pass waffles may be selected to ensure sure that the second pass waffles do not impact the locations where first pass waffles have been placed. For this reason, in one embodiment, the first pass waffles may be used as keep out for the second pass waffles. To make sure that second pass waffles are not created between first pass waffles and metal lines, the keep out has to be equal to at least the pitch of the first pass waffles plus the keep out. The minimum size of second pass waffle, or waffle fragments where the AndNot procedure is applied, may be selected to ensure manufacturability, and generally is no smaller than twice the minimum critical dimension of elements of the metal layer. Moreover, preferably forty-five degree angles will not be allowed on first or second waffles, since forty-five degree angles increase the mask data fracturing and writing times.

In addition, other criteria may be applied based on photolithography limitations for each specific layer or based on the size of the smallest landing pad used in a particular layout. For example, minimum spacing (Min space) between waffle fragments, that is second pass waffles after the AndNot procedure is applied, may be specified to ensure manufacturability. As noted above, the minimum spacing between fragment waffles will generally be no smaller than 2× Min Space.

Results

Table 2 shows the benefits realized by the new methodology described above on a full-chip layout. Table 2 is a comparison of different waffling schemes to an ultra-high density SRAM.

TABLE 2

Comparison of Waffling Schemes in a Ultra-high density SRAM

| Algorithm | # features on MMI | Pass oPD? | # Waffle Reduction |
|---|---|---|---|
| No waffle | 48,707 | NO | n/a |
| 1st pass only | 266,048 | NO | n/a |
| 2 passes. 2nd only where needed - new | 469,723 | YES | 75.4% |
| 2 passes same locations | 730,625 | YES | 60.2% |
| Previous approach | 1,762,447 | YES | reference |

Figure 11A:
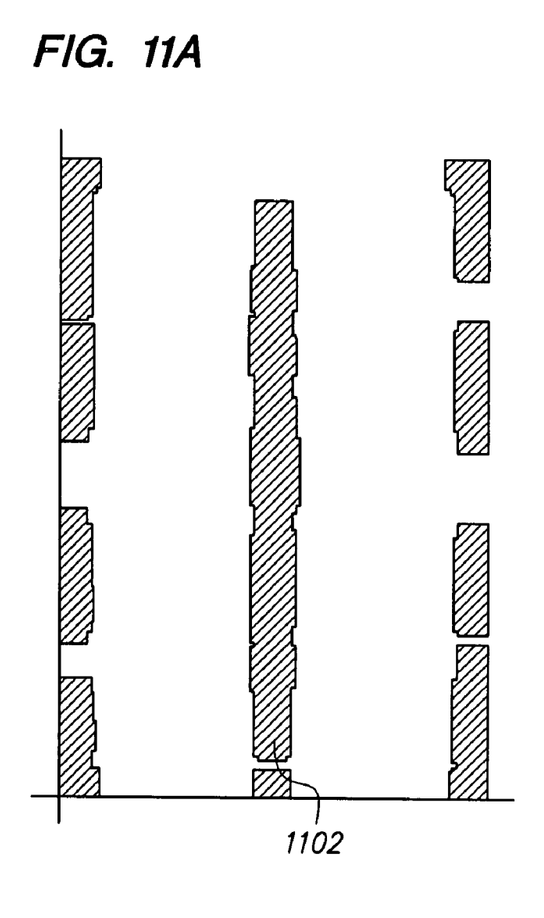
FIGS. 11A and 11B schematically show plan views of a portion of an integrated circuit layout having a patterned metal layer and multiple successively placed waffles in accordance with an embodiment of the present invention.
Figure 11B:
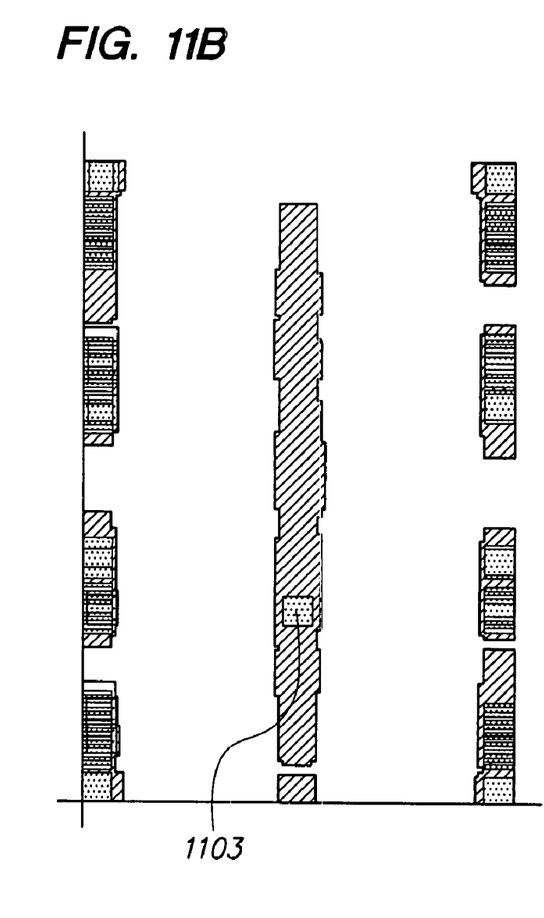

FIG. 11A shows an example layout for a device in accordance with an embodiment of the present invention. In FIG. 11A, the shaded areas represent regions where only first pass waffles were utilized (i.e., one pass approach). A first pass waffle area 1102 has been labeled for reference. FIG. 11B shows the same layout as FIG. 11A when both first and second pass waffles were utilized (i.e., two pass approach). In FIG. 11B, the dotted areas overlying the shaded areas represent second pass waffles. A second pass waffle area 1103 has been labeled for reference. The example of FIGS. 11A and 11B is for a high density memory device.

While the very dense (non-waffled) core occupies about 60% of the die area, most of the logic circuitry (central spine and edges) requires waffling. One pass waffling proves to be sufficient for the spine, but the edges may need two passes, especially where bond pads are placed.

The waffling technology of the present invention has also been proven on silicon on a dual port device. "Within Die" (WID) residual oxide variation decreased by more than two times using the new methodology and is well within the DOF requirements of a stepper used in the fabrication process.

CONCLUSIONS

In conclusion, embodiments of the present invention work with existing CAD routines to achieve high and uniform ILD profiles in production and meet a number of often contradictory process and design requirements. Three significant aspects of the methods of the present invention include: determining regions where waffling is required based on a dielectric (e.g., oxide) pattern density, rather than metal pattern density; (ii) adding multiple successive waffling patterns in separate passes or waffle-Add layers; and (iii) using an AndNot procedure to add waffles or dummy features that are conformal to adjacent elements of the metal pattern rather than having a fixed size or shape. It will be appreciated that each one of the above aspects can be used independently and contribute to improve the effectiveness of previous waffling methodologies.

The foregoing description of specific embodiments and examples of the invention have been presented for the purpose of illustration and description, and although the invention has been described and illustrated by certain of the preceding examples, it is not to be construed as being limited thereby. They are not intended to be exhaustive or to limit the invention to the precise forms disclosed, and many modifications, improvements and variations within the scope of the invention are possible in light of the above teaching. It is intended that the scope of the invention encompass the generic area as herein disclosed, and by the claims appended hereto and their equivalents.

What is claimed is:

1. A method of designing an integrated circuit, the method comprising:
    creating a lay out of a metal pattern to be formed on a substrate;
    partitioning the layout into a plurality of regions;
    calculating dielectric pattern densities for each of the plurality of regions;
    identifying from among the plurality of regions a first region that fails to meet a dielectric pattern density requirement;
    adding a plurality of first dummy features in the first region
    identifying a second region that fails to meet the dielectric pattern density requirement; and adding a plurality of second dummy features in the second region.

2. The method of claim 1 wherein each of the plurality of first dummy features has a predetermined shape.

3. The method of claim 1 wherein each of the plurality of first dummy features has a predetermined area.

4. The method of claim 1 wherein each of the plurality of first dummy features is spaced at least a first predetermined distance from elements of the metal pattern.

5. The method of claim 4 wherein the first predetermined distance is twice an oxide bias of a dielectric over the metal pattern.

6. The method of claim 1 wherein the second region has a portion that is within the first region.

7. The method of claim 1 wherein at least one of the plurality of second dummy features does not have a same area as a dummy feature in the plurality of first dummy features.

8. The method of claim 1 wherein at least one of the plurality of second dummy features is a fragmented version of a dummy feature in the plurality of first dummy features.

9. The method of claim 1 wherein the dielectric pattern density requirement is a minimum oxide pattern density.

10. A computer program product for generating a dummy pattern for an integrated circuit to be formed on a substrate having a metal pattern formed over a substrate, the computer program product comprising a computer readable storage medium and a computer-readable program code embedded therein, the computer-readable program code including instructions for:
    partitioning an integrated circuit layout into a plurality of regions;
    calculating dielectric pattern densities for each of the plurality of regions;
    identifying from among the plurality of regions a first region that fails to meet a minimum dielectric pattern density requirement;
    adding a plurality of first dummy features in the first region
    identifying a second region that fails to meet the dielectric pattern density requirement; and adding a plurality of second dummy features in the second region.

11. The computer program product of claim 10 wherein the plurality of first dummy features have a predetermined shape and area.

12. The computer program product of claim 10 wherein each of the plurality of first dummy features is spaced at least a first predetermined distance from elements of the metal pattern.

13. A method of manufacturing an integrated circuit, the method comprising:
    forming a metal pattern on a level of an integrated circuit, the metal pattern including a plurality of metal lines formed over a substrate;
    forming a first dummy pattern on a first region on the same level of the integrated circuit as the metal pattern, the first dummy pattern including a plurality of first dummy features placed based on a comparison of a dielectric pattern density of the first region and a dielectric pattern density requirement;
    forming a layer of dielectric over the metal pattern and the first dummy pattern
    forming a second dummy pattern on a second region on the same level as the metal pattern, the second dummy pattern including a plurality of second dummy features placed based on a comparison of a dielectric pattern density of the second region and the dielectric pattern density requirement; and
    planarizing the layer of dielectric by chemical-mechanical planarization (CMP).

14. The method of claim 13 wherein the layer of dielectric comprises an oxide and the dielectric pattern density is an oxide pattern density.

15. The method of claim 13 wherein each of the plurality of first dummy features has a same shape and area.

16. The method of claim 13 wherein the dielectric pattern density requirement is a minimum dielectric pattern density for regions on the level of the integrated circuit.

17. The method of claim 13 wherein the layer of dielectric comprises an oxide layer.

* * * * *